United States Patent [19]

Budde et al.

[11] Patent Number: 4,891,753
[45] Date of Patent: Jan. 2, 1990

[54] REGISTER SCOREBOARDING ON A MICROPROCESSOR CHIP

[75] Inventors: David Budde, Portland; Robert Riches, Hillsboro; Michael T. Imel, Beaverton; Glen Myers; Konrad Lai, both of Aloha, all of Oreg.

[73] Assignee: Intel Corporation, Santa Clara, Calif.

[21] Appl. No.: 935,193

[22] Filed: Nov. 26, 1986

[51] Int. Cl.$^4$ .............................................. G06F 9/18
[52] U.S. Cl. ................................. 364/200; 364/231; 364/232.8; 364/258; 364/259.9; 364/247; 364/262.4; 364/262.8
[58] Field of Search ... 364/200 MS File, 900 MS File

[56] References Cited

U.S. PATENT DOCUMENTS

| | | |
|---|---|---|
| 4,156,278 | 5/1979 | Wilhite .............................. 364/200 |
| 4,229,790 | 10/1980 | Gilliland et al. ................. 364/200 |
| 4,325,120 | 4/1982 | Colley et al. .................... 364/200 |
| 4,472,787 | 9/1984 | Busby .............................. 364/900 |
| 4,507,728 | 3/1985 | Sakamoto et al. ............... 364/200 |
| 4,589,064 | 5/1986 | Chiba et al. ..................... 364/200 |
| 4,620,275 | 10/1986 | Wallach et al. .................. 364/200 |
| 4,680,730 | 7/1987 | Omoda et al. ................... 364/200 |

Primary Examiner—Gareth D. Shaw
Assistant Examiner—Viet Q. Nguyen
Attorney, Agent, or Firm—Owen L. Lamb

[57] ABSTRACT

When a load instruction is encountered, a read operation is sent to the bus control logic, the register is marked as busy, and execution proceeds to the next instruction. When an instruction is executed, it proceeds providing that its source and destination registers are not marked busy; otherwise the instruction is retried. When data are returned as the result of a read operation, the destination register(s) are marked as not busy.

3 Claims, 4 Drawing Sheets

REGISTER SCOREBOARDING ON A MICROPROCESSOR CHIP

CROSS-REFERENCES TO RELATED APPLICATIONS

Copending patent application Ser. No. 863,878 filed May 16, 1986, of Meyers et al., entitled "Stack Frame Cache on a Microprocessor Chip" and assigned to Intel Corporation, the assignee of the present invention.

BACKGROUND OF THE INVENTION

Technical Field

The present invention relates to data processing systems, and more particularly to apparatus for minimizing idle time when executing an instruction stream in a pipelined microprocessor.

Background Art

It is wasteful for a processor, when executing a load instruction, to wait in an idle state for the result of the load instruction to be returned from memory, if the next one or more instructions do not depend on the result. Execution can be allowed to proceed to the next instruction by marking registers as busy or not busy as the case may be. The marking provides an indication as to whether a current instruction can be executed without interfering with the completion of a previous instruction. The marking of registers gives rise to the term "scoreboarding".

In order for commercial success with very large scale integrated (VLSI) microprocessor technology it is necessary to implement the architecture on one chip, maximize the performance, and keep the die size (silicon area) within manufacturable limits. High performance main frame computers have in the past used a register scoreboard technique to improve the through-put. The use of scoreboarding can reduce the loss per wait state in execution performance, if the technique can be successfully adapted to VLSI circuit technology, that is, if the silicon area consumed can be kept small.

It is an object of the present invention to provide an apparatus for minimizing the effect of load instructions on a pipeline of instructions in a VLSI microprocessor.

BRIEF DESCRIPTION OF THE INVENTION

Briefly, the above object is accomplished in accordance with the invention as follows. A microinstruction is placed on the microinstruction bus and a microinstruction valid line is precharged to an asserted (charged) level. When the load microinstruction is decoded, a read operation is sent to the bus control logic, the destination register is marked as busy, and execution proceeds to the next current microinstruction. Execution of the current microinstruction proceeds provided that its source and destination registers are not busy; otherwise the microinstruction valid line is unasserted (discharged) immediately after the current microinstruction appears on the microinstruction bus. The current mircoinstruction must then be reissued. When data is returned as the result of a read operation, the destination registers are marked as not busy.

In accordance with an aspect of the invention mask generation means are provided to mark the busy registers. The mask includes means operative upon the condition that only one register is affected by the operation for masking only said one register, and operative upon the condition that multiple registers are affected by the operation, for masking a predetermined block of registers. The registers in the block are a power of 2 in length and the block includes all registers affected by the operation.

DESCRIPTION OF THE DRAWINGS

The foregoing and other objects, features, and advantages of the invention will be apparent from the following more particular description of a preferred embodiment of the invention as illustrated in the accompanying drawings.

DESCRIPTION

Figure 1:
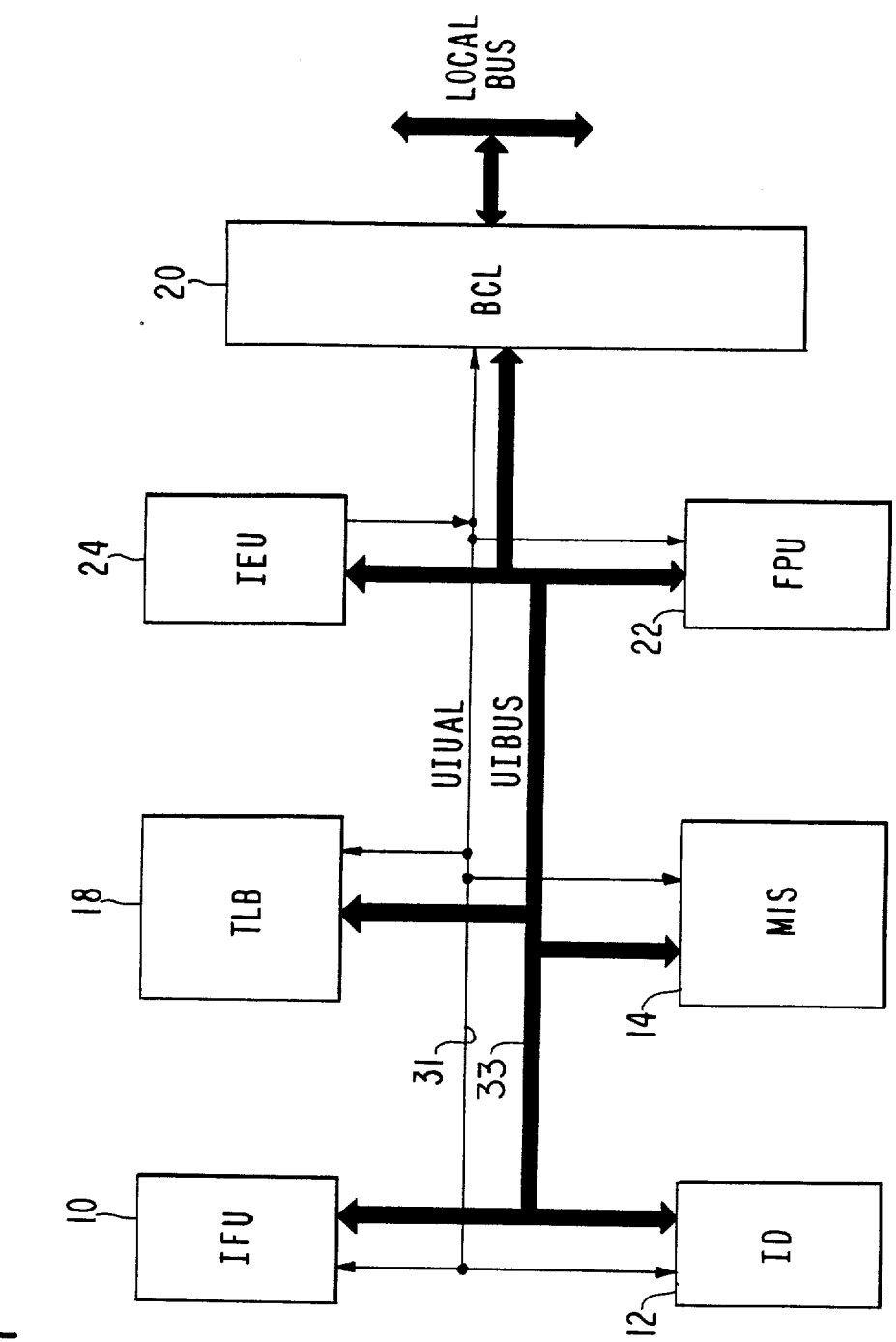
FIG. 1 is a functional block diagram of each of the major components of the microprocessor in which the invention is embodied.

Referring now to FIG. 1, the microprocessor is logically subdivided into seven major units: the Instruction Fetch Unit (IFU-10), the Instruction Decoder (ID-12), the Microinstruction Sequencer (MIS-14), the Translation Lookaside Buffer (TLB-18), the Floating Point Unit (FP-22), the Bus Control Logic (BCL-20), and the Integer Execution Unit (IE-24).

Communication paths between all of these units include a 32-bit data bus (not shown), a 29-bit microinstruction bus (UIBUS-26), and a microinstruction-valid signal (UIVAL-31). The microinstruction bus controls and synchronizes the activities of the autonomous units. This subdivision, together with the ability for each unit to sequence itself autonomously, allows for parallel and pipelined activities inside the chip that result in high performance. Each of the units is described briefly below.

The Instruction Fetch Unit (IFU) fetches, prefetches, and caches instructions from memory for use by the ID. The IFU also maintains six instruction pointers that track instructions through the pipeline. The IFU caches the mostrecently used blocks of instructions and keeps the instruction decoder supplied with a stream of instructions. It also contains the operand reduction logic controlled by the ID.

The Instruction Decoder (ID) decodes and controls instruction (macrocode) execution. It decodes instructions, performs operand addressing and fetching, handles branch instructions (i.e., instruction pointer manipulation), and either emits execution microinstructions (for simple instructions) or starts microprogram flows (for complex instructions).

The Microinstruction Sequencer (MIS) sequences microcode flows to handle chip initialization, macroinstructions that are too complex to handle directly, and exception and interrupt conditions. The MIS contains a 3K by 42-bit microcode ROM and sequencing logic for microcode flows. The functions that the MIS performs include: fetch the next microinstruction, microprogram branching, handle exception conditions, maintain a scoreboard on the register file in accordance with the principles of the present invention, and in conjunction with the ID, detect macroinstruction-boundary and trace events.

The IEU executes most of the microinstructions issued by the ID and the MIS. It contains the registers visible to the programmer, scratch registers used by microcode, a 32-bit ALU, a 32-bit barrel shifter, and the logic needed to execute its instructions. It features an ALU bypass path that allows ALU operations to be executed at the rate of one per cycle. It also contains a single-port register file that can be accessed twice in one cycle such that the result from the previous operation can be stored in the same cycle as a new operand is being fetched for the current operation.

The Floating Point Unit (FPU) contains the logic needed to perform floating point operations, and integer multiply and divide.

The FPU contains four floating point registers, several temporary registers, a 68-bit shifter that can shift up to 16 bits in either direction, a 69-bit mantissa adder, a significant bit finder, a mantissa ROM, two internal 68-bit data paths, and a separate exponent data path that includes its own 16-bit adder and registers. It executes integer multiply and divide, and all floating point operations, including the cordic algorithms for the transcendental instructions.

The Translation Lookaside Buffer (TLB) performs the address translation needed to implement virtual memory mechanisms. The address translation and memory protection uses an associative table of storage descriptors and page table entries. The TLB contains a 48-entry address cache, a six-bit address adder, and memory protection checking hardware. Each entry in the address cache contains 27 CAM bits and 38 RAM bits.

Finally, the Bus Control Logic (BCL) pipelines and sequences external bus accesses. The BCL contains the interface hardware to the external local bus, manages the bus protocol, and recognizes external events (e.g., interrupts, initialization). It contains an outgoing 33-bit wide address and data FIFO, an incoming 33-bit data FIFO, and a sequencer. The outbound FIFO allows up to 3 requests to be queued in the BCL so that the rest of the processor can proceed with execution, independent of the memory access latency. The inbound FIFO buffers read data returning from external memory until a free cycle is available to transfer the data to its destination.

Instruction Set

The instruction set of the microprocessor is similar in design to those of RISC (reduced instruction-set computer) machines. All instructions are 32-bits in length and must be aligned on word boundaries, and only load, store, and branching instructions reference memory (all others reference registers located on the chip). Since the most-often used instructions are executed in one cycle, instruction decoding is also done in one cycle, and, via pipelining, allows the processor to sustain an instruction-per-cycle processing rate.

Most instructions have the REG format, which specifies an opcode and three registers/literals (i.e., one of 32 registers, or a constant value in the range 0–31). The COBR format is for a set of compare-and-branch instructions. The CTRL format covers branch and call instructions. The MEM formats are for load and store instructions. The formats are shown below.

| REG FORMAT | | | | | | | | |
|---|---|---|---|---|---|---|---|---|
| opcode | src/dst | source_2 | m3 | m2 | m1 | opcode | XXX | source_1 |
| 8 | 5 | 5 | 1 | 1 | 1 | 4 | 2 | 5 |

| COBR FORMAT | | | | |
|---|---|---|---|---|
| opcode | source_1 | source_2 | m1 | displacement |
| 8 | 5 | 5 | 1 | 13 |

| CTRL FORMAT | |
|---|---|
| opcode | displacement |
| 8 | 24 |

| MEM FORMAT | | | | | |
|---|---|---|---|---|---|
| opcode | src/dst | abase | md | O | offset |
| 8 | 5 | 5 | 1 | 1 | 12 |

Much of the instruction set is what one would expect to encounter in any processor (e.g., add, multiply, shift, branch).

Register Model

At any point in time, thirty-two 32-bit registers and four 80-bit floating-point registers are addressable (the 32 registers can also be used to hold floating-point values). Of the 32 registers, 16 are global registers and 16 are local registers. The difference is that the 16 global registers are unaffected when crossing procedure boundaries (i.e., they behave like "normal" registers in other architectures), but the local registers are affected by the call and return instructions.

When a call instruction is executed, the processor allocates to the called procedure a new set of 16 local registers from an on-chip pool of register sets. If the processor's four-set pool is depleted, the processor automatically reallocates a register set by taking one register set associated with an earlier procedure and saving the contents of that register set in memory. The contents of the earlier procedure's register set are saved in the first 16 words of that procedure's stack frame in memory. The return instruction causes the current local register set to be freed (for use by a subsequent call). This mechanism is called the stack frame cache and is more fully described in the aboveidentified copending application of Meyers et al., Ser. No. 863,878.

The microprocessor is pipelined. There are normally five instructions in different stages of execution in the pipeline at any given moment. In any given cycle, the instruction pointer pointing to instruction n+4 is computed, instruction n+3 is read from the instruction cache, instruction n+2 is decoded and issued to the microinstruction bus, instruction n+1 is being executed, and the result of instruction n is being stored into the register file.

In many respects, the processor behaves as a RISC processor, in that the most-frequent instructions control the data paths without any microcode interpretation. However, the processor also contains a microinstruction ROM for execution of complex instructions, implicit operations (e.g., process switching), and so on.

The above is accomplished by a close correspondence between the macroinstructions (those instructions defined in the external architecture and seen by the instruction decoder) and the microinstructions (those instructions that are driven on the microinstruction bus UIBUS which control the individual units).

For the largest class of instructions (most register-register operations), the instruction decoder (ID) simply rearranges some of the bits, which changes the macroinstruction into a microinstruction, and drives the latter on the microinstruction bus.

For a second class of macroinstructions, those requiring some sequencing, the ID issues multiple microinstructions itself. These microinstructions typically move and prepare the source operands, execute the arithmetic operation, and move the result to the indicated destination. An example of this is integer multiply. The ID issues the two microinstructions that move the source operands from the IEU register file to working registers in the FPU. It then issues the microinstruction to do the multiplication in the FPU. Lastly, it issues the microinstruction to move the result back to the IEU register file.

For the remaining macroinstructions, such as the floating-point sine instruction, the ID starts a ROM microcode flow stored in ROM which is sequenced by the MIS.

Register Scoreboarding

The MIS (14) shown in FIG. 1 maintains a scoreboard on the register file described in the above-referenced Meyers et al. patent application. When a load instruction is encountered, a read operation is sent to the bus control logic, one or more of the registers to be used are marked as busy, and execution proceeds to the next instruction. When an instruction is executed, it proceeds providing that its source and destination registers have not been previously marked busy; otherwise a signal is generated by the scoreboard logic which causes the instruction to be retried. When data are returned as the result of a read operation, the destination registers are marked as not busy.

The effect of this can be seen in the following code sequences:

|     | (A)       |     | (B)       |
| --- | --------- | --- | --------- |
| ld  | r1,(r7)   | ld  | r1,(r7)   |
| add | r1,1,r1   | add | r2,r3,r4  |
| add | r2,r3,r4  | add | r1,1,r1   |

In sequence A, the value in the memory location referred to by the address in register r7 is read and loaded into r1, then 1 is added to r1, then r2 and r3 are added. In this sequence, execution must pause after the load instruction, since the next instruction depends on the loaded value.

In the equivalent sequence B, the code is rearranged to take advantage of the scoreboard, seeing that there exists an independent instruction that could be moved to immediately after the load instruction. This optimization is an easy one for compilers to do.

Figure 2:
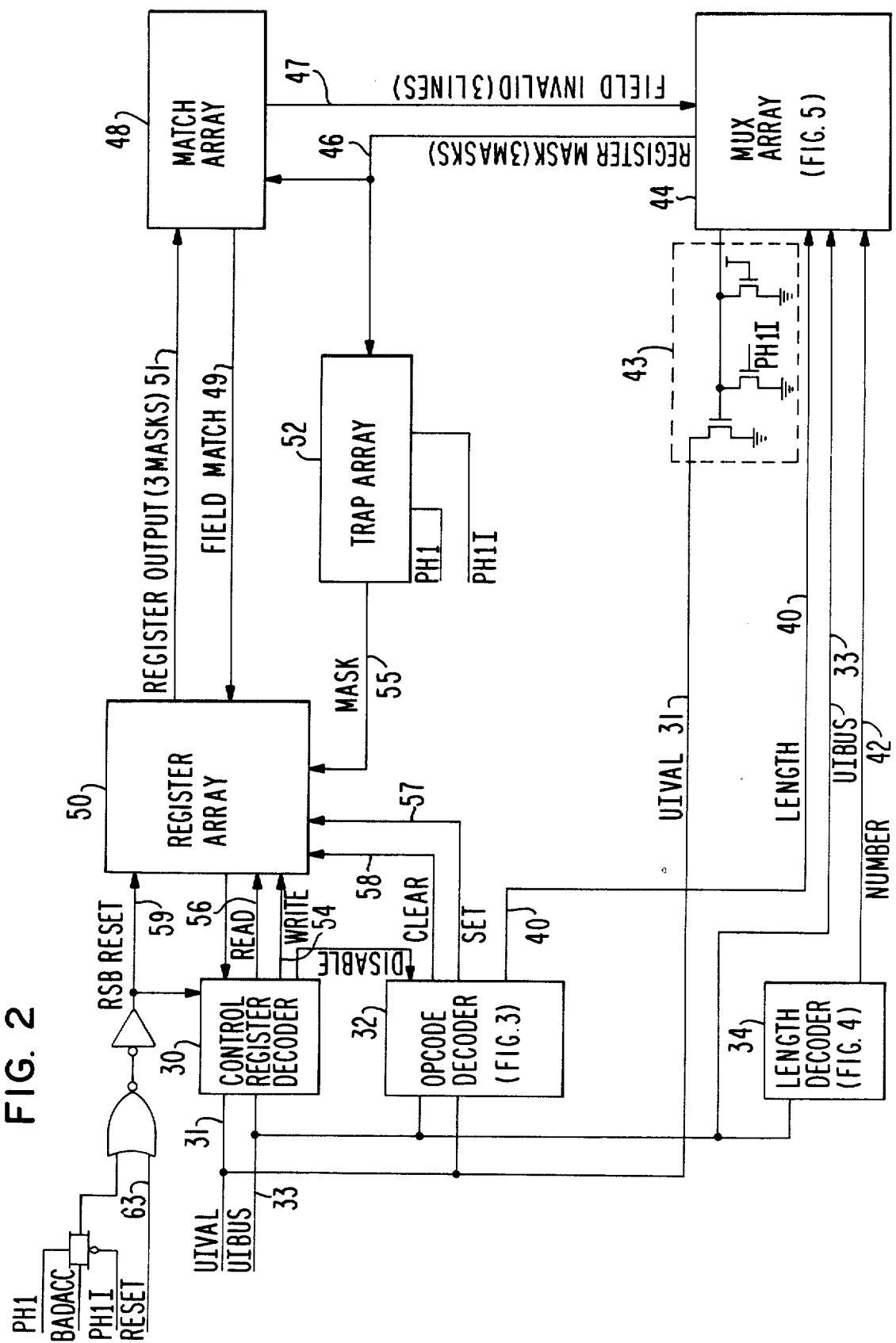
FIG. 2 is a more detailed block diagram of the resource scoreboarder (RSB) portion of the microinstruction sequencer of FIG. 1.

The scoreboarding mechanism within the MIS (14) is shown in more detail in FIG. 2 which is a block diagram of the source scoreboarder (RSB).

The circuit of FIG. 2 is driven by a clock having a two non-overlapping clock phase design such as the clock used in the Intel 80286 and 80386. Four clocks, PH1, PH1I, PH2, PH2I, are distributed in the chip. PH1 and PH2 are traditional NMOS non-overlapping clocks with equal duty cycles. PH1I and PH2I are the PMOS analogs to PH1 and PH2 and are exact inversions of PH1 and PH2 respectively. Successive PH1 and PH2 assertions form a microcycle that is 62.5 ns when the chip is operated at 16 Mhz frequency.

The main components of the resource scoreboarder (RSB) of FIG. 2 are Control Register Decoder (30), Opcode Decoder (32), Length Decoder (34), MUX Array (44), Match Array (48), Register Array (50) and Trap Array (52). Match Array (48) together with Register Array (50) comprise a content addressable memory (CAM).

The microinstruction bus UIBUS is the main microinstruction bus of the chip. It is a 29 bit, phase 1 precharge, phase 2 discharge, asserted high bus.

The bidirectional microinstruction valid UIVAL line (31) validates the microinstruction on the UIBUS (33). It is phase 2 precharge, phase 1 discharge, asserted high. If this line is unasserted (pulled low) during phase 1, the microinstruction which appeared on the UIBUS (33) the previous phase 2 is treated as invalidated and must be reissued by the originating source during the next cycle. The term "asserted" as used herein applies to pulling a line high and the term "unasserted" as used herein applies to pulling a line low. It will be understood by those skilled in the art that the circuitry can be designed so that the reverse is true and still be within the scope of the invention, that is, "asserted" applying to pulling a line low and the term "unasserted" applying to pulling a line high.

Each register in register array (50) contains a mask. A mask refers to a block of zero or more IEU registers. Each pending load operation is associated with a mask stored in register array (50). Subsequent instructions are decoded by opcode decoder (32) and the match array (48) determines for the subsequent instruction if the registers designated by that instruction are busy or not busy. The match array (48) compares against the fields of the microinstruction and asserts one or more of the field match lines (49) if there is a scoreboard hit, i.e. if the register or registers are busy. The occurrence of a match causes the UIVAL line (31) to be pulled low by discharge logic (43) indicating to all units attached to the UIVAL line that a scoreboard hit has occurred. The instruction is thus invalidated and must be issued again by the unit that originated it.

A mask generator is provided in MUX array (44) which allows more than one register to be marked busy at one time. The mask generator (64) is shown in more detail in FIG. 5.

Figure 3:
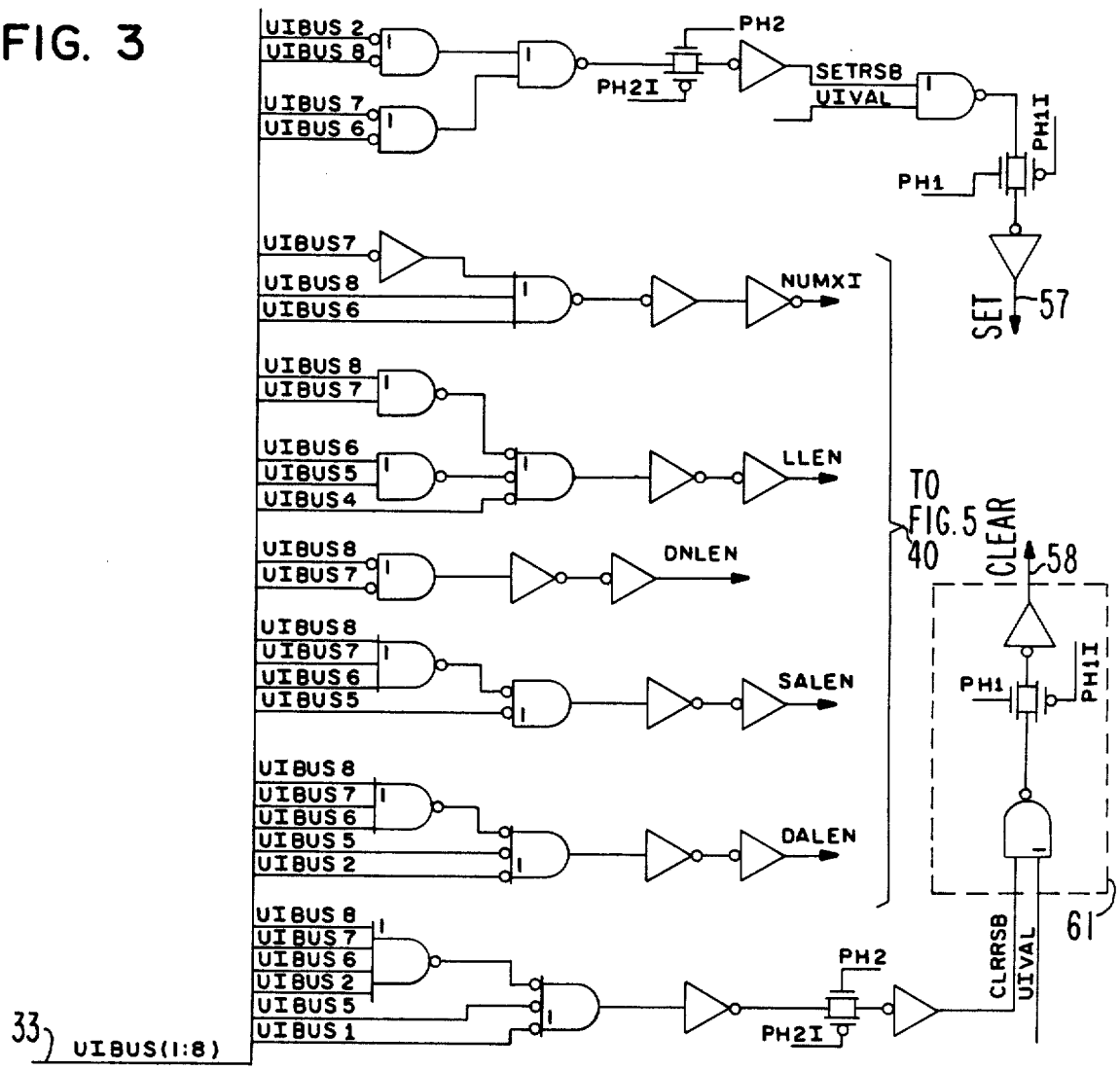
FIG. 3 is a more detailed block diagram of the opcode decoder of FIG. 2.

The Opcode Decoder (32) is shown in more detail in FIG. 3. The Opcode Decoder (32) decodes the UIBUS (33) opcode field to determine which operand field contains a valid register address, and what length encoding method is used by that opcode.

The UIBUS lines are decoded to produce the set RSB signal which generates the RSB set line (57) which writes the mask into the register array. The RSB clear signal (58) is generated to clear the entry in the register array which has a hit.

The NUMXI signal means that this is a multiword operation. The LLEN, BNLEN, SALEN, and DALEN lines tell which length and coding method is being used for that particular opcode. These signals are presented to the mux array to tell it which signals from the length decoder to use to determine the length of the operation.

Figure 4:
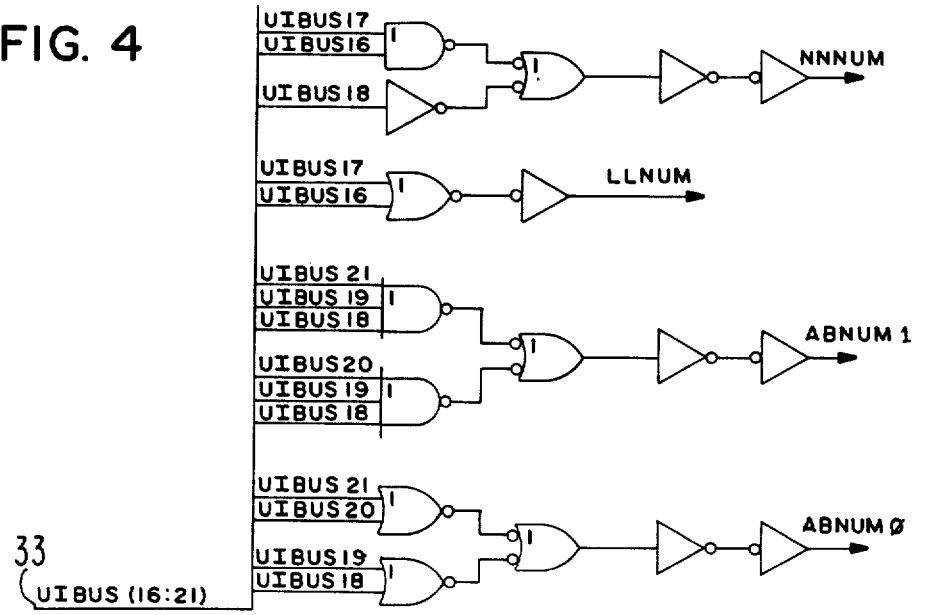
FIG. 4 is a more detailed block diagram of the the length decoder of FIG. 2; and, FIG. 5 is a more detailed block diagram of the register mask generator within the MUX Array of FIG. 2.

The Length Decoder (34) is shown in more detail in FIG. 4. The Length Decoder (34) decodes the length fields encoded in the Source 2 operand field for those opcodes that use encoded length specifications. These two pieces of information are combined in the mask generator (64), shown in FIG. 5, to derive the number of registers (1, 4, or 16) needed for each operand field. The address and the number of registers for each operand field are used by the Mask generator (64) to generate a mask (46). The mask (46) is presented to match array (48) to compare for a match or "hit" with the entries in the Register Array (50) as described above.

Figure 5:
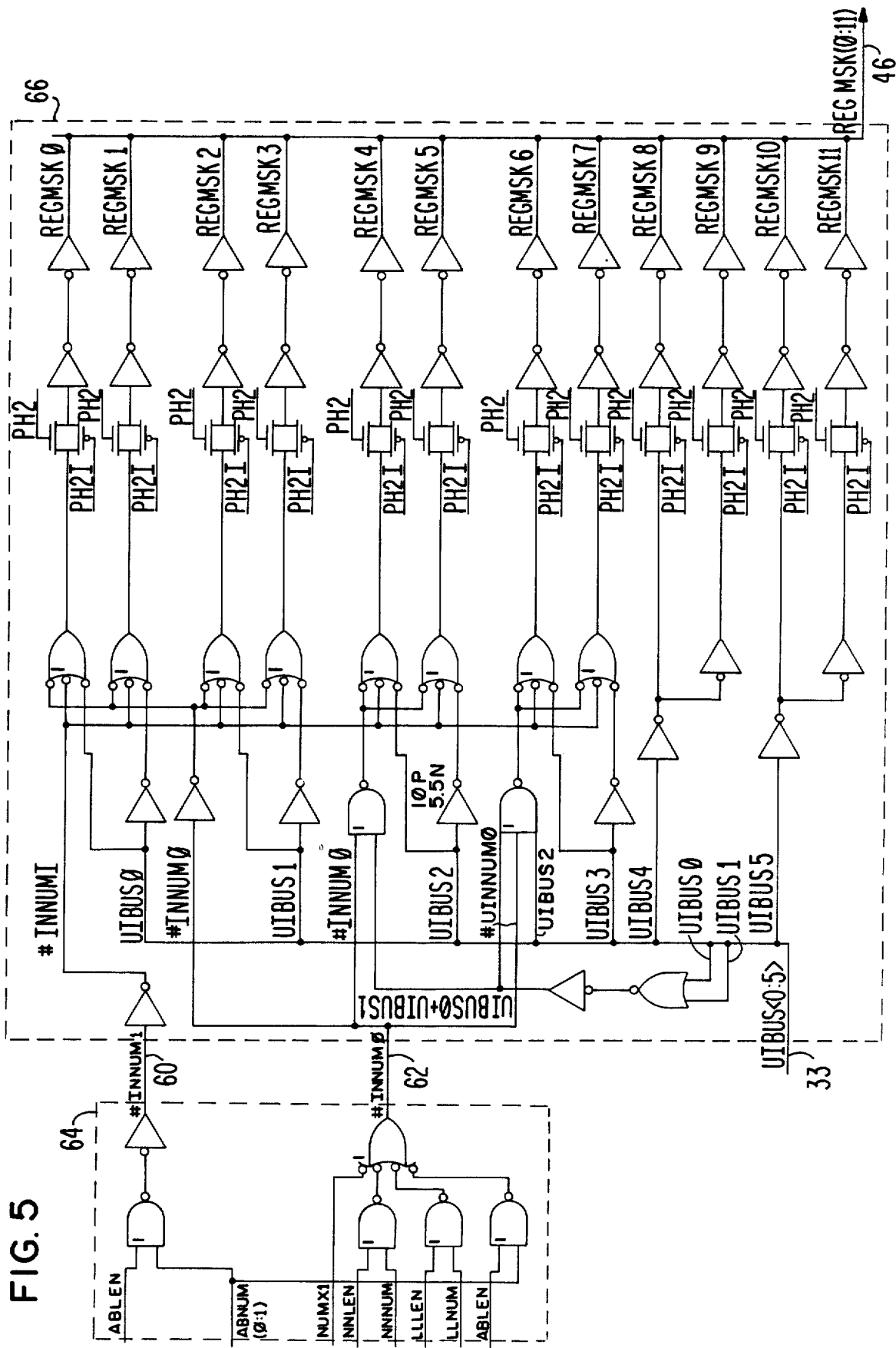

The MUX block shown in FIG. 5 operates in two stages. The first (64) uses the length-encoding method information (40) from the opcode decoder of FIG. 3 and the operandlength information (42) from the length decoder of FIG. 4 to produce the true operand length. The length-encoding method information (40) from the opcode decoder tells the second stage (66) of the mask generation logic which of the several length-encoding methods is used by the current opcode. The operand-length information (42) from the length decoder gives the length that would be indicated for each of the defined operand-length-encoding methods. These two pieces of information are combined to generate the true current-operand length, which is encoded on (60) and (62) according to the following definition:

| #InNum0 (60) | #InNum1 (62) | Operand length |
|---|---|---|
| 0 | 0 | 1 word |
| 0 | 1 | 4 words |
| 1 | 0 | 16 words |
| 1 | 1 | 16 words |

The second stage (66) uses this current operand-length information and the operand-address field from the microinstruction bus to produce a mask corresponding to the appropriate block of registers. The definition of the mask bits is the same as the definition of bits 0-11 of the RSB control registers. The logic (66) is arranged to implement the mapping from address and length to register block described below.

Referring again to FIG. 2, the UIVAL discharge logic (43) pulls UIVAL low during the Phase 1 immediately after the microinstruction appears on the UIBUS (33) if a "hit" occurs indicating that the microinstruction requires a "busy" register and therefore cannot be completed. RSB Control Registers The register array (50) contains three control registers. Each register holds one of the scoreboard entry masks. RSB control register 1 also contains a Disable bit which disables the RSB UIVAL discharge logic (43) shown in FIG. 2. All bits shown are readable and writable. The format for these registers is shown below:

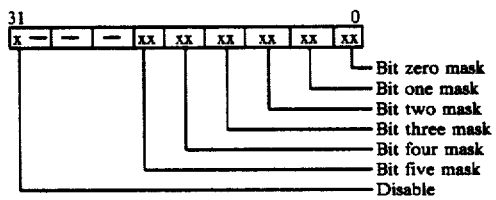

The RSB control registers contain the following fields: Disable: Bit 31. This bit, when set, disables the RSB UIVAL discharge logic. It is present only in RSB control register 1. Masks: Bits 0:1, 2:3, 4:5, 6:7, 8:9, 10:11. Each of these fields (two bits each) holds the mask for the corresponding bit in the register address field. The encodings are:
00 match nothing
01 match zero
10 match one
11 match anything The match-nothing condition is legal only if all mask bits of that entry are zero, which indicates an empty entry. The control register (30) allows microcode to read data from and write data into the register array (50) by means of the read line (56) and the write line (54). The disable bit is a bit in one of the registers which allows the logic to be disabled.

Modified natural boundary alignment rules with wraparound within each register set are used by the Mux Array (44) to generate the mask. A register set is defined as a block of 16 registers. The four register sets are frame registers 0 to 15, global registers 0 to 15, scratch registers 0 to 15, and scratch registers 16 to 31. If only one register is affected by the operation, only that register is scoreboarded. If multiple registers are affected by the operation, the RSB scoreboards a block of registers which is a power of 2 in length and which includes all registers affected by the operation. In order to make the decoding circuitry buildable, this block or registers is not always the smallest that would suffice. TABLE I below shows the blocks of registers within a register set scoreboarded for all applicable length and register address combinations.

TABLE I

| Register Address | Block scoreboarded if opcode specifies (n) registers | | |
|---|---|---|---|
| | 1 | 4 | 16 |
| 0 | 0 | 0-3 | 0-15 |
| 1 | 1 | 0-7 | 0-15 |
| 2 | 2 | 0-7 | 0-15 |
| 3 | 3 | 0-7 | 0-15 |
| 4 | 4 | 4-7 | 0-15 |
| 5 | 5 | 0-15 | 0-15 |
| 6 | 6 | 0-15 | 0-15 |
| 7 | 7 | 0-15 | 0-15 |
| 8 | 8 | 8-11 | 0-15 |
| 9 | 9 | 8-15 | 0-15 |
| 10 | 10 | 8-15 | 0-15 |
| 11 | 11 | 8-15 | 0-15 |
| 12 | 12 | 12-15 | 0-15 |
| 13 | 13 | 0-15 | 0-15 |
| 14 | 14 | 0-15 | 0-15 |
| 15 | 15 | 0-15 | 0-15 |

A Read Memory microinstruction causes the Register Array (50) to write (54) the destination mask output (55) from the trap array (52) into one of its entries, which marks the destination registers "busy." The trap array (52) is driven by PH1 and PH1I and serves to synchronize the transfer of the mask data from the MUX array to the register array. A Move from BCL or a Move from Frame microinstruction with a destination which matches an entry in register array (50) marked "busy" clears (58) the appropriate entry if the clear scoreboard "S" bit in the microinstruction opcode is set. For split accesses, only the last (in time) part of a split access to return data clears the scoreboard. The "S" bit is set on the lower half of a split access, so the scoreboard is not cleared by the lower half of a split access. Since the TLB sends the halves of a split access to the BCL in order of increasing address, and the BCL returns the halves in the same order, the scoreboard entry is cleared only when all the data has been returned.

The BADACC signal (61) and the reset signal (63) are used to generate the RSB reset (59) which is used to clear the register array. The RSB reset also goes into the control register decoder (30) to reset the disable bit. The BADACC line is used to indicate that a memory access has failed. If it was read access, it is necessary to clear the registers in the array.

During operation, a microinstruction appears on the UIBUS (33) on phase 2 of the clock and is gated into the control register decoder (30), the opcode decoder (32), and the length decoder (34). The opcode decoder looks at what operation is specified, a memory read, a memory write, some addition or logic function, or a data movement operation. The opcode decoder then determines what length decoding method is used and which register fields actually point to valid registers. There are three register fields on the UIBUS (operand fields). Some opcodes use all three operands as register, some only use one, and some may not use any at all. One of the fields goes into the length decoder (34) and it has encoded length information in the operand field.

There are three different methods of encoding length information, one method for memory accesses, one method for byte-move operations, and one method for floating-point operations. The length decoder produces a number which corresponds to the length that corresponds to one of the methods decoded. The number tells the mux array (44) how many registers are to be used in the operation.

There is one group of instructions that always uses two registers. The rest of the instructions use only one register. The mux array (44) will logically determine how many registers are involved.

There are effectively three mux arrays, one for each of the three operand fields. The mux array takes the length and the number information and the address from the UIBUS and produces a register mask (46). The destination field goes to the trap array (52). The register mask also goes to the match array (48), which is a three-by-three matrix of match cells. Each match cell looks at one mask from the register array (50) and one mask from the mux array. The reason for the three registers and three rows of match cells in the match array (48) is to allow three entries to be scoreboarded at any one time. This means there can be three outstanding accesses. Any of the three operand fields could hit any of the three outstanding memory accesses; hence, a three-by-three matrix. The match array compares the mask from the register array and the mask from the mux array to determine if there is a hit. The register output (51) includes three sets of 12 signals each, providing three masks. Each mask has the same semantics as the masks from the mux array. If a match occurs, the match array will assert one of three field invalid signals (47) to activate the UIVAL discharge circuit (43) to pull down the UIVAL line (31). The field match line (49) determines access completion as a result of a move from BCL instruction on the UIBUS. The match array is used to determine which of the three outstanding accesses is being completed.

A microinstruction will indicate that an access is beginning, that an access is ending, or some other operation. All three of these types of microinstructions go through the process of generating field invalid signals. For example, if an access is already in progress, another access cannot be generated that will conflict with it. All other operations are merely checked to see if there is a conflict. The access-begin microinstructions are checked to see if they can be allowed to happen. If they can, the mask that is passed through the trap array (52) is written into one of the empty registers in the register array (50). When the access completes, the field match line (49) out of the match array (48) is used in that case to determine which of the three outstanding accesses is to be cleared.

The field match signal (49), in conjunction with the clear signal (58), is used by the register array to clear one of the registers. Thus, the clear signal basically means that the access is complete, that is, there was a move from BCL. The set signal (57) is used in a similar manner when an access begins with a read mem microinstruction. When a read mem occurs, the mask (55) of the trap array is written into one of the empty registers in the array by means of the set signal (57). When all three registers in the register array are full, writing into them is prevented by the finite depth of the pipeline to the BCL and the TLB. Two memory accesses can be outstanding in the BCL. One would be on the bus, and one would be waiting to go on the bus. A third memory access can be sitting in the TLB. If there are three memory accesses outstanding, the TLB will prevent another one from occurring by pulling down the UIVAL line.

While the invention has been particularly shown and described with reference to preferred embodiments thereof, it will be understood by those skilled in the art that the foregoing and other changes in form and detail may be made therein without departing from the scope of the invention.

What is claimed is:

1. For use in a data processor capable of being connected to a main memory and a microinstruction bus (33) for carrying a current microinstruction including an opcode field which specifies an operation to be performed, a resource scoreboarder comprising:

a register array (50) having a plurality of registers stored therein, each one of said plurality of registers containing a mask entry, thereby providing a plurality of mask entries in said register array (50):

a microinstruction valid line (31) which, when asserted, validates said current microinstruction on said microinstruction bus (33) and when unasserted invalidates said current microinstruction on said microinstruction bus (33);

first decoding means (30, 32) connected to said register array (50), to said microinstruction valid line (31) and to said microinstruction bus (33);

second decoding means (34) connected to said microinstruction bus (33);

said first decoding means (30, 32) being operative upon assertion of said microinstruction valid line (31) for decoding said opcode field to provide a first value (40) corresponding to which operand field contains a valid register address, said second decoding means (34) including means for decoding said opcode field to generate a second value (42) related to the operand length of an instruction indicated for each of a plurality of operand-length-encoding methods; and, combining means (43, 44) connected to said microinstruction valid line (31), to said first decoding means (30, 32), and to said second decoding means (32, 34), for combining said first value (40) and said second value (42) to produce a third value (60, 62-FIG. 5) corresponding to the number of registers needed for said operation to be performed;

said combining means (43, 44) including mask generation means (64-FIG. 5) responsive to said third value (60, 62-FIG. 5) for generating a register mask (46); and, register match means (48) connected to said register array (50) and to said combining means (43, 44) responsive to said register mask (46) for comparing said register mask (46) with said plurality of mask entries stored in said register array (50), to select the one of said plurality of mask entries in said register array (50) that matches said register mask (46);

said first decoding means (30, 32) including control register decoder means (30) for decoding a first (Read Memory) microinstruction on said microinstruction bus (33) for causing said register array (50) to write a new mask into said one of the entries of said register array (50) selected by said register match means (48), to thereby mark said one of said plurality of registers "busy" for said operation to be performed;

said combining means (43, 44) including means (43) for unasserting said microinstruction valid line (31) immediately after said current microinstruction appears on said microinstruction bus upon the condition that said opcode field of said current microinstruction specifies a register that has been marked "busy".

2. The combination in accordance with claim 1 wherein said control register decoder means (30) includes means for decoding a second (Move) microinstruction on said microinstruction bus (33), said second microinstruction including a "clear scoreboard" bit, said combination further comprising:

first means (61) in said first decoding means (30, 32) for asserting a clear signal (58) upon the condition that said "clear scoreboard" bit in said second microinstruction is set, for causing said register array (50) to clear said one of said entries of said register array (50) selected by said register match means (48).

3. The combination in accordance with claim 1 wherein said mask generation means (64-FIG. 5) includes means operative upon the condition that said number of registers needed by said operation is equal to one for masking only one of said registers, and operative upon the condition that multiple registers are needed by said operation, for masking a predetermined block of register, the number of registers in said block being raised by a power of 2 in length, said block of 2n registers including all registers needed by said operation to be performed.

* * * * *